United States Patent
Ho

(10) Patent No.: US 7,840,089 B2
(45) Date of Patent: Nov. 23, 2010

(54) IMAGE SHARPENING APPARATUS AND METHOD THEREOF

(75) Inventor: Sheng-Feng Ho, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 882 days.

(21) Appl. No.: 11/790,197

(22) Filed: Apr. 24, 2007

(65) Prior Publication Data

US 2008/0101716 A1 May 1, 2008

(30) Foreign Application Priority Data

Oct. 27, 2006 (TW) .............................. 95139872 A

(51) Int. Cl.
*G06K 9/40* (2006.01)
(52) U.S. Cl. .................. 382/266; 382/263; 382/264
(58) Field of Classification Search ................ 382/254, 382/260, 263, 264, 266; 348/625, 627, 597, 348/606–610
See application file for complete search history.

(56) References Cited

U.S. PATENT DOCUMENTS

| | | | |
|---|---|---|---|
| 4,503,461 A * | 3/1985 | Nishimura ............... 378/98.12 |
| 5,038,388 A | 8/1991 | Song | |
| 5,231,677 A * | 7/1993 | Mita et al. ................. 382/266 |
| 5,430,497 A * | 7/1995 | Strolle et al. ............... 348/607 |
| 5,739,922 A | 4/1998 | Matama | |
| 6,633,654 B2 * | 10/2003 | Hannigan et al. ........... 382/100 |
| 6,985,636 B1 | 1/2006 | Semenchenko | |
| 2005/0012866 A1 * | 1/2005 | Chiang et al. ............... 348/625 |
| 2006/0039622 A1 * | 2/2006 | Casale et al. ............... 382/266 |

* cited by examiner

*Primary Examiner*—Yon Couso
(74) *Attorney, Agent, or Firm*—Rabin & Berdo, P.C.

(57) ABSTRACT

An image sharpening apparatus for sharpening an original image is disclosed. The image sharpening apparatus includes a low-pass filter, a high-pass filter, an edge detector, a sharpening parameter generating unit and an operating unit. The low-pass filter, the high-pass filter and the edge detector receive the original image and respectively output a low frequency image, a high frequency image and several edge detecting values. The sharpening parameter generating unit receives the edge detecting values and outputs corresponding sharpening parameters, respectively. The operating unit adjusts the high frequency image according to these sharpening parameters, outputs an adjusted high frequency image, and combines the adjusted high frequency image with the low frequency image to obtain an edge-sharpened output image.

19 Claims, 7 Drawing Sheets

| 0 | 0 | 0 | 0 | 0 |
|---|---|---|---|---|
| 0 | 8 | 16 | 8 | 0 |
| 0 | 16 | 32 | 16 | 0 |
| 0 | 8 | 16 | 8 | 0 |
| 0 | 0 | 0 | 0 | 0 |

FIG. 5A

| -1 | -4 | -6 | -4 | -1 |
|---|---|---|---|---|
| -4 | 0 | 8 | 0 | -4 |
| -6 | 8 | 28 | 8 | -6 |
| -4 | 0 | 8 | 0 | -4 |
| -1 | -4 | -6 | -4 | -1 |

FIG. 5B

| 1 | 4 | 6 | 4 | 1 |
|---|---|---|---|---|
| 4 | -8 | -24 | -8 | 4 |
| 6 | -24 | 68 | -24 | 6 |
| 4 | -8 | -24 | -8 | 4 |
| 1 | 4 | 6 | 4 | 1 |

FIG. 5C

IMAGE SHARPENING APPARATUS AND METHOD THEREOF

This application claims the benefit of Taiwan application Serial No. 095139872, filed Oct. 27, 2006, the subject matter of which is incorporated herein by reference.

BACKGROUND OF THE INVENTION

1. Field of the Invention

The invention relates in general to an image sharpening apparatus, and more particularly to an image sharpening apparatus capable of enhancing sharpness of an image according to an edge intensity of the image.

2. Description of the Related Art

Digital images captured by various optical devices, such as a camera or a scanner, have lowered sharpness due to various factors including, for example, poor designs of the optical devices, the digital image processing procedures, or shakes occurred when the cameras are capturing images. Thus, the digital image usually has to be sharpened so that the sharpness of the image is enhanced. The conventional image sharpening method, such as an unsharp masking method, is to locally lighten brighter portion of an edge region and to locally darken darker portion of the edge region so that the sharpness of the image is enhanced. However, the conventional image sharpening method cannot distinguish image edge from noise. Thus, the conventional image sharpening method not only enhances the sharpness of the image but also amplifies the noise in the image so that the overall image quality is deteriorated.

SUMMARY OF THE INVENTION

The invention is directed to an image sharpening apparatus capable of enhancing sharpness of an original image while suppressing a response of noise. The image sharpening apparatus of the invention decomposes the original image into a low frequency image and a high frequency image, and then adjust the high frequency image according to an edge intensity of the original image. With regarding to a region of the original image having low the edge intensity (smaller than a predetermined noise standard deviation), the intensity corresponding to this region is reduced because the region contains a lot of noise signal. With regarding to a region of the original image having higher edge intensity (greater than a predetermined noise standard deviation), the intensity corresponding to this region is increased because the region is mainly an edge of the image. The image sharpening apparatus according to the embodiment of the invention can not only enhance the sharpness of the image but also effectively suppress the noises so that the noises cannot be increased with the enhancement of the image sharpness.

According to a first aspect of the present invention, an image sharpening apparatus for enhancing sharpness of an original image is provided. The image sharpening apparatus includes a low-pass filter, a first high-pass filter, an edge detector, a sharpening parameter generating unit and an operating unit. The low-pass filter receives the original image and outputs a low frequency image. The first high-pass filter receives the original image and outputs a first high frequency image. The edge detector receives the original image, detects edge intensities of the original image and outputs different edge detecting values. The sharpening parameter generating unit respectively outputs corresponding sharpening parameters according to the different edge detecting values. The operating unit adjusts the first high frequency image by enhancing the edge and suppressing the noises according to the sharpening parameters, and then combines the adjusted first high frequency image with the low frequency image to generate an output image.

According to a second aspect of the present invention, an image sharpening method for enhancing sharpness of an original image is provided. The method includes the steps of: filtering the original image with a low-pass filter to obtain a low frequency image, and filtering the original image with a high-pass filter to obtain a corresponding first high frequency image; detecting edge intensities of the original image and outputting corresponding edge detecting values; obtaining corresponding sharpening parameters according to the different edge detecting values; adjusting the first high frequency image by enhancing the edge and suppressing the noises according to the sharpening parameters; and combining the low frequency image with the adjusted first high frequency image to obtain an output image.

According to a third aspect of the present invention, an image sharpening apparatus for enhancing sharpness of an original image is provided. This image sharpening apparatus includes a low-pass filter, N high-pass filters (N is a positive integer), an edge detector, a sharpening parameter generating unit and an operating unit. The low-pass filter receives the original image and outputs a low frequency image. The high-pass filters receive the original image and respectively output N high frequency images. The edge detector receives this original image and outputs corresponding edge detecting values according to different edge intensities. The sharpening parameter generating unit receives the edge detecting values and respectively outputs N sets of sharpening parameters corresponding to the N high-pass filters. The operating unit respectively adjusts the corresponding N high frequency images according to the N sets of sharpening parameters and thus outputs N adjusted high frequency images. Then, the operating unit combines the low frequency image with the N adjusted high frequency images to obtain an output image.

The invention will become apparent from the following detailed description of the preferred but non-limiting embodiments. The following description is made with reference to the accompanying drawings.

BRIEF DESCRIPTION OF THE DRAWINGS

FIG. 5A shows an example of a low-pass filter according to the embodiment of the invention.

FIG. 5B shows an example of a band-pass filter according to the embodiment of the invention.

FIG. 5C shows an example of a high-pass filter according to the embodiment of the invention.

DETAILED DESCRIPTION OF THE INVENTION

The image sharpening apparatus according to the embodiment of the invention is for enhancing sharpness of an original image. Because both edge (signals) and noise (signals) pertain to high-frequency signals, it is only necessary to enhance edge region according to the high-frequency signal. The image sharpening apparatus according to the embodiment of the invention decomposes the original image into a low frequency image and a high frequency image, and determines how to adjust the high frequency image according to the distribution of both edge intensity and noises of the original image. With regarding to a region of the original image having the low edge intensity (e.g., smaller than a predetermined noise standard deviation), the intensity corresponding to the region is reduced (i.e., the noises are suppressed) because the region contains a lot of noise. With regarding to a region of the original image having high edge intensity (e.g., greater than a predetermined noise standard deviation), the intensity corresponding to the region is increased (i.e., the edge is enhanced). The image sharpening apparatus according to the embodiment of the invention can not only enhance the sharpness of the image but also effectively suppress the noises so that the noises are not amplified with the enhancement of the sharpness of the image.

Figure 1:
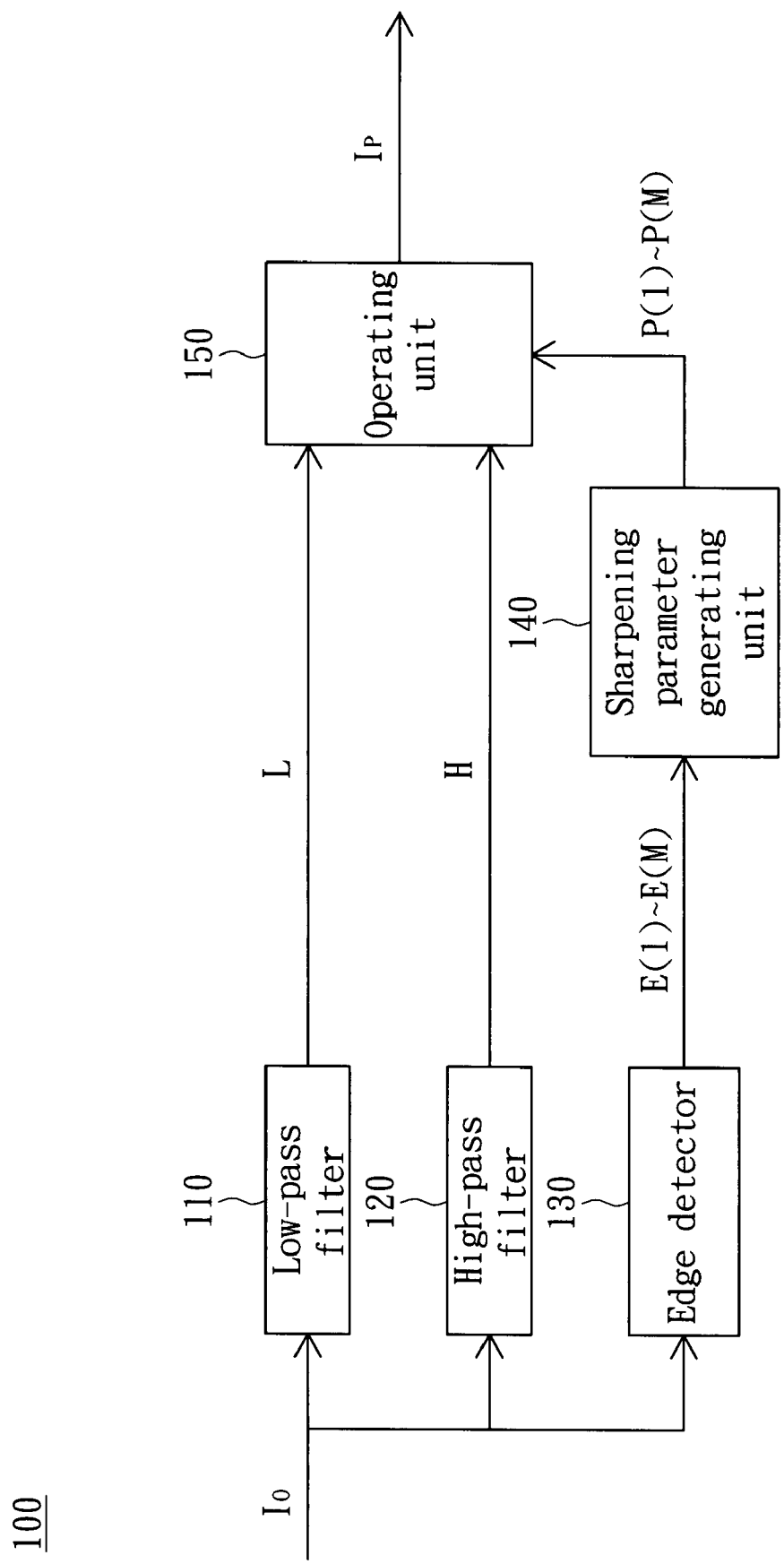
FIG. 1 is a block diagram showing an image sharpening apparatus according to an embodiment of the invention.

FIG. 1 is a block diagram showing an image sharpening apparatus 100 according to an embodiment of the invention. Referring to FIG. 1, the image sharpening apparatus 100 includes a low-pass filter 110, a high-pass filter 120, an edge detector 130, a sharpening parameter generating unit 140 and an operating unit 150.

The low-pass filter 110, such as a low-pass spatial filter mask, receives (i.e. filters) an original image Io and outputs a low frequency image L. The high-pass filter 120, such as a high-pass spatial filter mask, also receives (i.e. filters) the original image Io and outputs a high frequency image H.

The edge detector 130, such as a Sobel spatial filter mask, also receives this original image Io, detects the edge of the image, and outputs corresponding M edge detecting values E(1)~E(M) according to the different edge intensities, wherein M is a positive integer greater than or equal to one. The edge detecting values E(1)~E(M) are normalized with the unit of "noise standard deviation". The higher edge intensity represents the clearer edge of the image. The lower edge intensity represents the unclear edge of the image (i.e. the regions corresponds the low edge intensity may contain a lot of noise instead of real edge regions).

The sharpening parameter generating unit 140 outputs corresponding sharpening parameters P(1)~P(M) according to the edge detecting values E(1)~E(M), respectively. If the edge detecting value E(J) is smaller than a threshold value, for example, one noise standard deviation, it represents that the region contains a lot of noise, the sharpening parameter P(J) corresponding thereto is set as 0 to suppress the noises. If the edge detecting value E(J) is greater than a threshold value, for example one noise standard deviation, the sharpening parameter P(J) is set greater than 0, wherein J is a positive integer, and $1 \leq J \leq M$.

The operating unit 150 receives the low frequency image L, the high frequency image H and the sharpening parameters P(1)~P(M), and outputs an output image Ip. The operating unit 150 adjusts the high frequency image H correspondingly according to the sharpening parameters P(1)~P(M) to obtain an adjusted high frequency image Hp (not shown). In this embodiment of the invention, the edges of the high frequency image H are adjusted according to the sharpening parameters P(1)~P(M) to obtain the adjusted high frequency image Hp. The operating unit 150 combines the low frequency image L with the adjusted high frequency image Hp to obtain the output image Ip.

Figure 2:
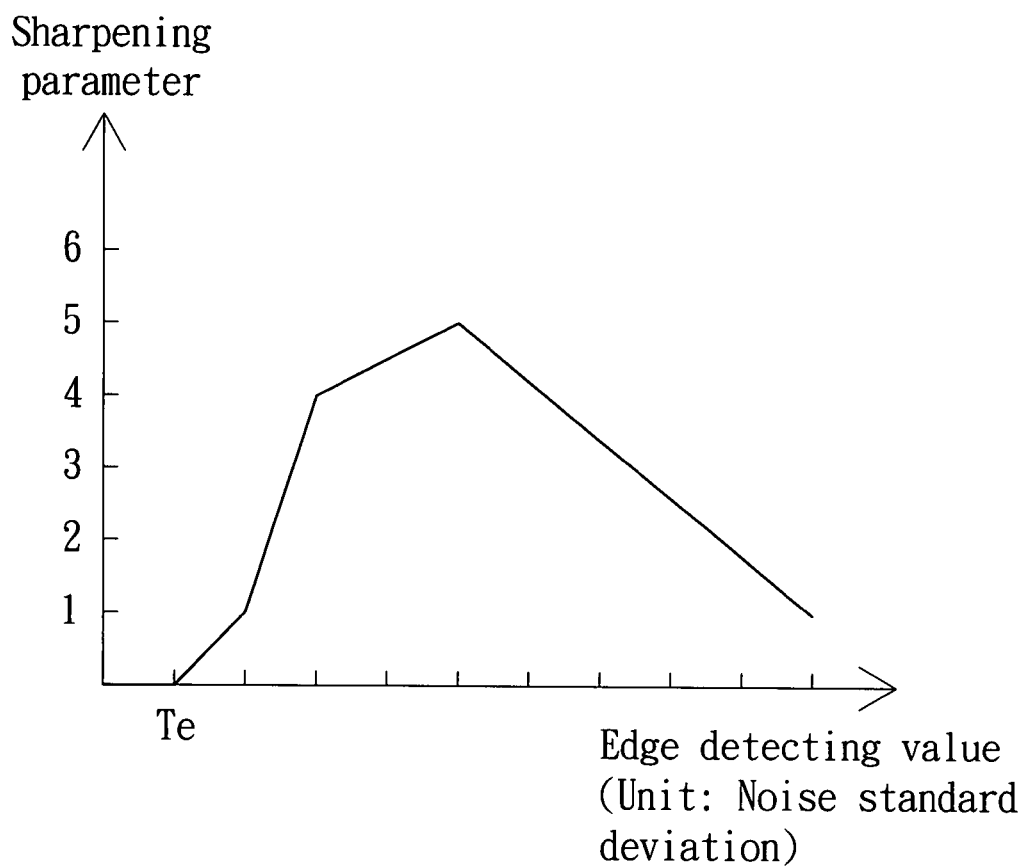
FIG. 2 shows an example of a relationship between edge detecting values and sharpening parameters in a sharpening parameter generating unit.

FIG. 2 shows an example of a relationship between edge detecting values and sharpening parameters in a sharpening parameter generating unit. The horizontal axis and the vertical axis of FIG. 2 respectively represent the edge detecting values and the sharpening parameters, wherein the edge detecting values are normalized as the unit of "noise standard deviation" for the purpose of obtaining the distribution of the noise. According to the probability distribution, most of the noises will be distributed within "one noise standard deviation", and the ration of the noises distributed out of "one noise standard deviation" are far smaller than that distributed within "one noise standard deviation". In this embodiment, Te is set as 1 (noise standard deviation) but is not limited thereto. For example, Te may be 1.5, 2, 2.5 or 3 (noise standard deviations). In this embodiment shown in FIG. 2, if the edge detecting value E(J) is smaller than one threshold value Te, the corresponding sharpening parameter P(J) is set as 0. If the edge detecting value E(J) is 3Te, the corresponding sharpening parameter P(J) is set as 4. Thus, most of the noises can be suppressed because most the noises are located within one noise standard deviation.

The effect of the image sharpening apparatus according to the embodiment of the invention will be discussed according to the influence on the high frequency image H caused by the sharpening parameter P(J) corresponding to the edge detecting value E(J). When the edge detecting value E(J) is smaller than one threshold value Te (e.g., one noise standard deviation), it represents that the region (corresponding to the edge detecting value E(J)) of the original image having low edge intensity. Besides, as mentioned hereinabove, after being processed by edge detection, most of noises has the similar intensity distributed within the threshold value Te (one noise standard deviation). In other words, most of the signals in the region (smaller than Te or one noise standard deviation) are noise signals. The sharpening parameter P(J) corresponding to the edge detecting value E(J) is set as 0. Consequently, the low edge intensity of the original image and most of the noises have been eliminated after multiplying the region (i.e., the region having the edge detecting value E(J) smaller than one threshold value Te) by the sharpening parameter P(J), so that the function of eliminating the noises can be achieved.

Similarly, when the edge detecting value E(J) locates between Te and 2Te, it represents that the edge intensity of the region (corresponding to edge detecting value E(J)) of the original image still having low edge intensity. Although the ratio of the noise contained in this region to the overall noises is smaller than that of the noise contained in Te to the overall noise, the ratio has not to be ignored; thus, the sharpening parameter P(J) corresponding to the edge detecting value E(J) is set between 0~1. Consequently, the sharpening parameter P(J) and the corresponding region of the high frequency image H are multiplied together to obtain the adjusted high frequency image Hp having the edge intensity smaller than that of the high frequency image H. Similarly, the noise in this region (Te to 2Te) is also reduced. When a low edge detecting value of a region of the original image is determined, the noises corresponding to the region of the high frequency image can be suppressed by selecting a correspondingly low sharpening parameter.

As shown in FIG. 2, if the edge detecting value E(J) is greater than 2Te, it represents that the region (corresponding to the edge detecting value E(J)) of the original image having stronger edge intensity. Besides, the ratio of the noises distributed in this region (i.e. greater than 2Te or greater than 2 noise standard deviations) to the overall noises is far smaller than that of the noises distributed in the region smaller than 2Te according to the probability distribution. In other words, most of the signals in this region (i.e. greater than 2Te or greater than 2 noise standard deviation) are the edge portions of the original image, and the noises only occupy a relatively small portion. Referring to FIG. 2, the sharpening parameter P(J) corresponding to the edge detecting value E(J) is suddenly increased. For example, the parameter P(J) corresponding to 2Te is 1, the parameter P(J) corresponding to 3Te is 4, and the parameter P(J) corresponding to 5Te is 5. Thus, the adjusted high frequency image Hp having the corresponding edge intensity which are respectively 1, 4 or 5 times the edge intensity of the high frequency image H is obtained after multiplying the region (i.e., the region having the edge detecting value E(J) greater than 2Te or greater than 2 noise standard deviation) by the sharpening parameter P(J). This means that the intensity of the high frequency image corresponding to the edge region of the original image is enhanced. Of course, the enhanced intensity is not restricted to these values, but may be determined according to the requirement of the image. When the edge detecting value of one original image is higher than a threshold value, the corresponding edge region of the high frequency image is enhanced by selecting the corresponding sharpening parameter so that the sharpness of the output image is enhanced.

In addition, as shown in FIG. 2, when the edge detecting value E(J) is greater than 5Te, the corresponding sharpening parameter P(J) is getting smaller. This means that it is unnecessary to significantly emphasize the corresponding high frequency image H because the edge region of the original image is quite clear, so the corresponding sharpening parameter P(J) has not to be enlarged too great.

The image sharpening apparatus according to the embodiment of the invention detects the edge intensity of a region of the original image, and determines the sharpening parameter according to the distributed region of noises and the edge intensity of the original image. With regarding to the region with low edge intensity (for example, smaller than 1 or 2 noise standard deviation) of the original image, the corresponding sharpening parameter reduces the intensity of this region of the high frequency image. Because most of the noises are located within 1 and 2 noise standard deviation, the noises are reduced (or even eliminated). With regarding to the region with high edge intensity (for example, 2 noise standard deviation above) of original image, the corresponding sharpening parameter enhances the intensity of the high frequency image, so that the region of the output image is sharpened. Because only a small portion of noises is located within the noise standard deviation (i.e. 2 noise standard deviation above) after the edge detecting process, the amplifying effect of the noise response is not obvious while the enhancing the sharpness of the output image.

Thus, the invention can not only enhance the sharpness of the output image but also suppress the noises so that the quality of the output image is greatly enhanced.

Figure 3:
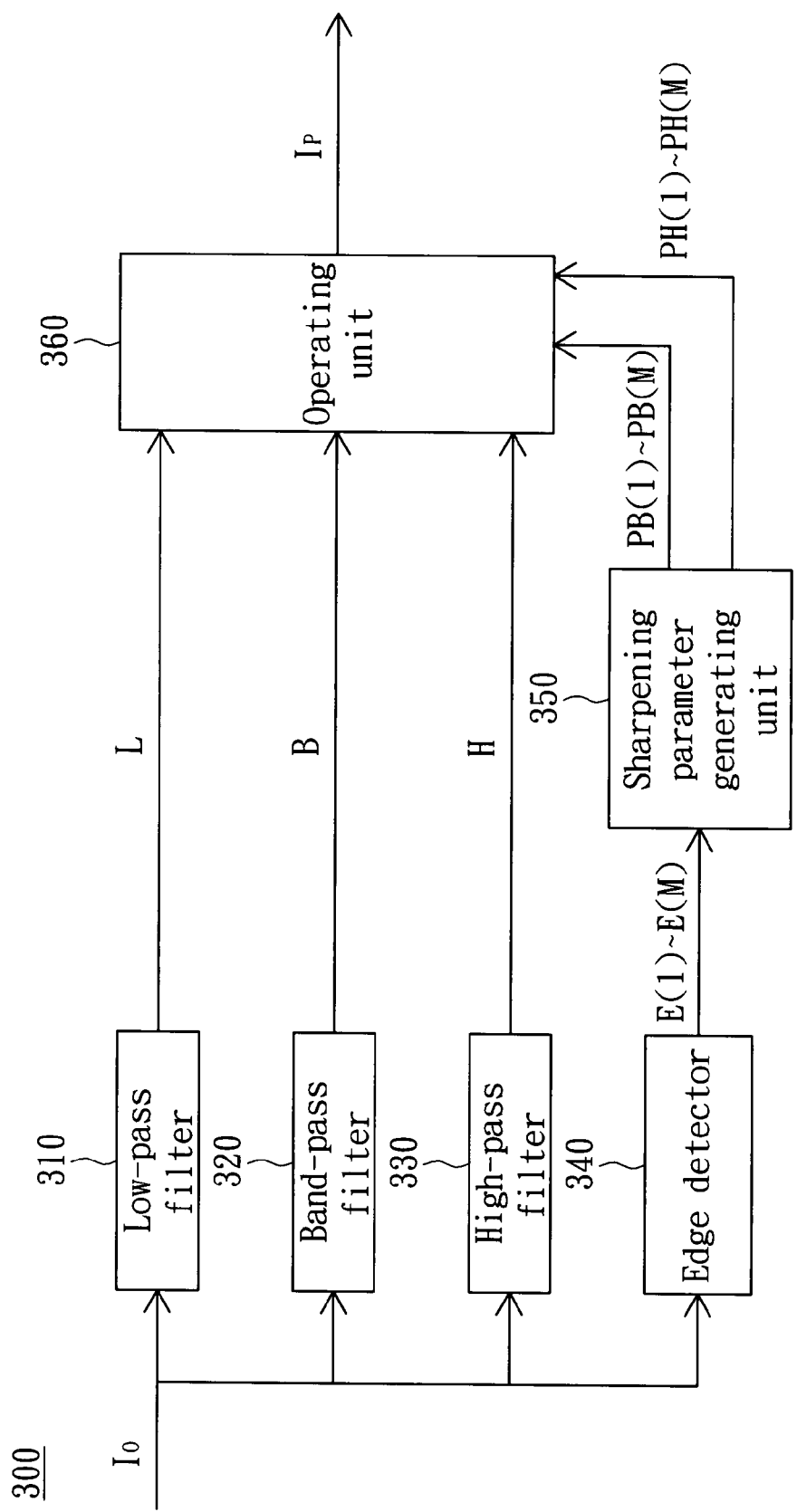
FIG. 3 is a block diagram showing an image sharpening apparatus according to another embodiment of the invention.

FIG. 3 is a block diagram showing an image sharpening apparatus 300 according to another embodiment of the invention. Referring to FIG. 3, the image sharpening apparatus 300 includes a low-pass filter 310, a band-pass filter 320, a high-pass filter 330, an edge detector 340, a sharpening parameter generating unit 350 and an operating unit 360. In this embodiment, the low-pass filter 310, the band-pass filter 320 and the high-pass filter 330 decompose the original image Io into a low frequency image L, a band frequency image B and a high frequency image H, respectively.

The sharpening parameter generating unit 350 generates M first sharpening parameters PB(1)~PB(M) and M second sharpening parameters PH(1)~PH(M) according to the edge detecting values E(1)~E(M) generated by the edge detector 340, wherein M is a positive integer greater than or equal to 1. The edge detecting values E(1)~E(M) respectively correspond to the first sharpening parameters PB(1)~PB(M) and the second sharpening parameter PH(1)~PH(M). The first sharpening parameters PB(1)~PB(M) adjust the band frequency image B and output an adjusted band frequency image Bp (not shown). The second sharpening parameters PH(1) ~PH(M) are used to adjust the high frequency image H so that an adjusted high frequency image Hp (not shown) is outputted.

The operating unit 360 combines the low frequency image L, the adjusted band frequency image Bp and the adjusted high frequency image Hp together to obtain an output image Ip.

Figure 4A:
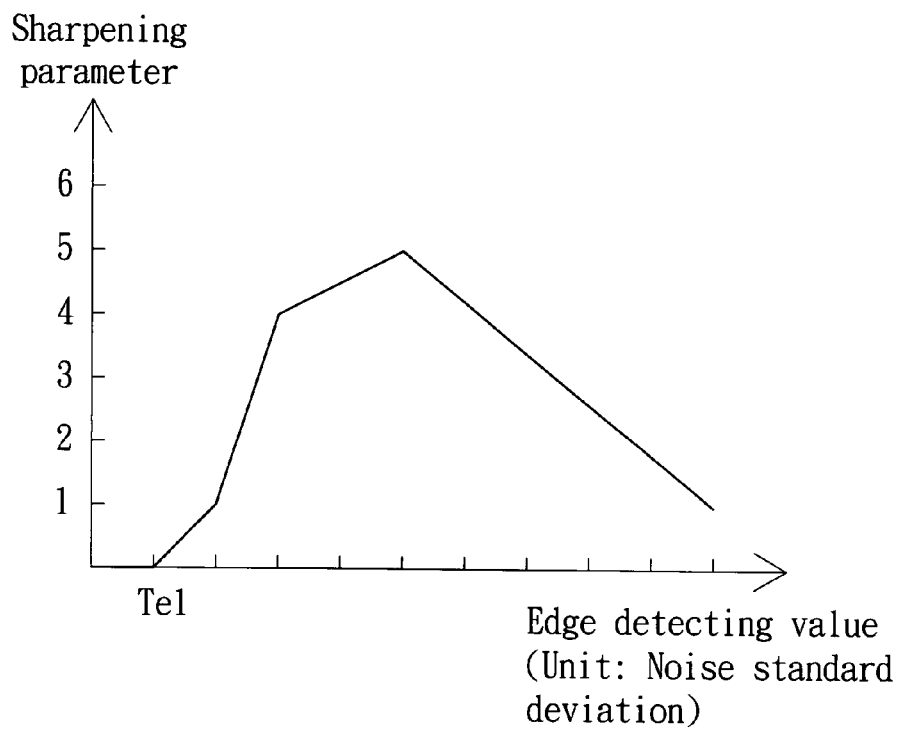
FIG. 4A shows an example of a relationship between edge detecting values and first sharpening parameters in a sharpening parameter generating unit.

FIG. 4A shows an example of a relationship between the edge detecting values E(1)~E(M) and the first sharpening parameters PB(1)~PB(M) in the sharpening parameter generating unit 350. The sharpening parameter generating unit 350 determines the value of the first sharpening parameter PB(J) from the edge detecting value E(J) according to the curve of FIG. 4A, wherein J is a positive integer, $1 \leq j \leq M$. The operating unit 360 adjusts the edge region of the band frequency image B according to the first sharpening parameter PB(J) and outputs the adjusted band frequency image Bp.

Figure 4B:
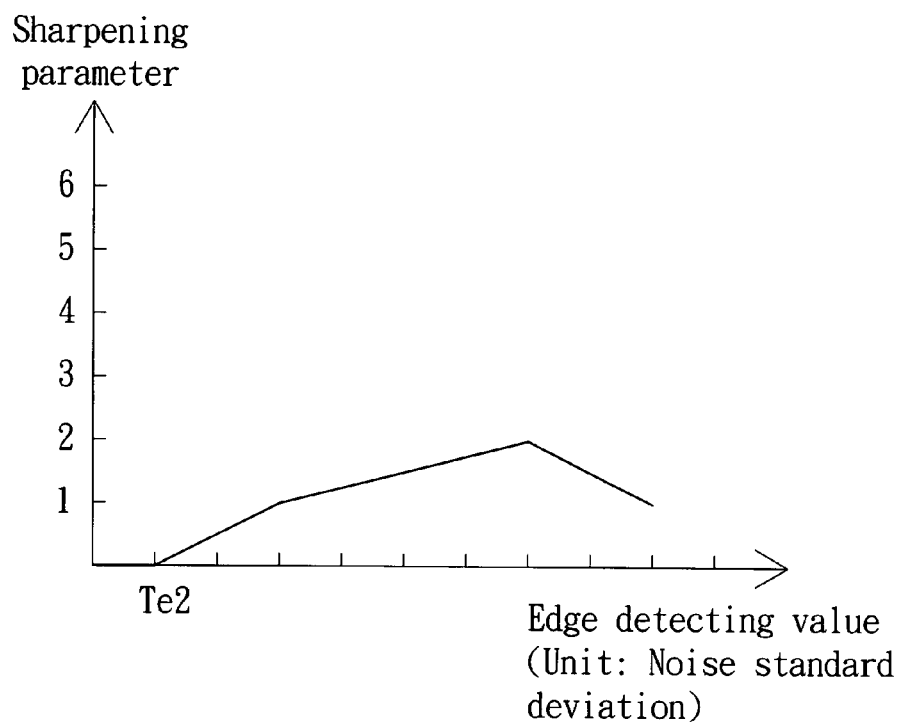
FIG. 4B shows an example of a relationship between edge detecting values and second sharpening parameters in a sharpening parameter generating unit.

FIG. 4B shows an example of a relationship between the edge detecting values E(1)~E(M) and the second sharpening parameters PH(1)~PH(M) in the sharpening parameter generating unit 350. Similarly, the sharpening parameter generating unit 350 determines the value of the second sharpening parameter PH(J) from the edge detecting value E(J) according to the curve of FIG. 4B, wherein J is a positive integer, $1 \leq j \leq M$. The operating unit 360 adjusts the edge region of the high frequency image H according to the second sharpening parameter PH(J) and outputs the adjusted high frequency image Hp.

In FIG. 4A, the curve specified between the edge detecting values E(1)~E(M) and the first sharpening parameters PB(1) ~PB(M) is similar to that specified between the edge detecting values and the sharpening parameters in FIG. 2. If one edge detecting value E(J) of a region is smaller than a threshold value Te1, for example, one noise standard deviation, the corresponding first sharpening parameter PB(J) is set as 0. If the edge detecting value E(J) of a region ranges between Te1 and 2Te1, the corresponding first sharpening parameter PB(J) is set greater than 0 but smaller than 1. Thus, the intensity of the region of the band frequency image B is reduced. If the edge detecting value E(J) of a region is greater than 2Te1, the first sharpening parameter PB(J) is increased rapidly so that the intensity of the region of the band frequency image B(J) is increased. The relationship between the edge detecting values and the first sharpening parameters is designed according to the reason, which has been mentioned hereinabove in the section corresponding to FIG. 2, and detailed descriptions thereof will be omitted.

The curve specified between the edge detecting values E(1)~E(M) and the second sharpening parameters PH(1)~PH (M) in FIG. 4B is also similar to that specified between the edge detecting values and the sharpening parameters in FIG. 2. The difference between FIGS. 4A and 4B is that the first sharpening parameters PB(1)~PB(M) in FIG. 4A are used to adjust the edge region of the band frequency image B, while the second sharpening parameters PH(1)~PH(M) in FIG. 4B are used to adjust the edge region of the high frequency image H. Due to human eye is more sensitive to the band-frequency image signal and insensitive to the high-frequency image signal, the image sharpening process is aimed at the band frequency image B so that the sharpened image has the significant effect with respect to the human eye. On the contrary, if the high frequency image H is sharpened, the sharpened image almost has no effect with respect to the human eye. That is, the human eye cannot sense any significant difference. According to this reason, the increases in the second sharpening parameters PH(1)~PH(M) are not as significant as those of the first sharpening parameters PB(1)~PB(M). However, the increasing trends in the second sharpening parameters PH(1)~PH(M) is also similar to the first sharpening parameters PB(1)~PB(M), for example, if one edge detecting value E(J) is smaller than the threshold value Te1 and Te2, both the corresponding sharpening parameters PB(J) and PH(J) are set as 0.

The low-pass filter 310, the band-pass filter 320 and the high-pass filter 330 may be arbitrarily designed so that frequencies corresponding thereto can cover all the frequency bands. In the embodiment of the invention, each of the low-pass filter 310, the band-pass filter 320 and the high-pass filter 330 is implemented using a 5×5 spatial filter mask. FIGS. 5A~5C show examples of the low-pass filter 310, the band-pass filter 320 and the high-pass filter 330 according to the embodiment of the invention.

Figure 6:
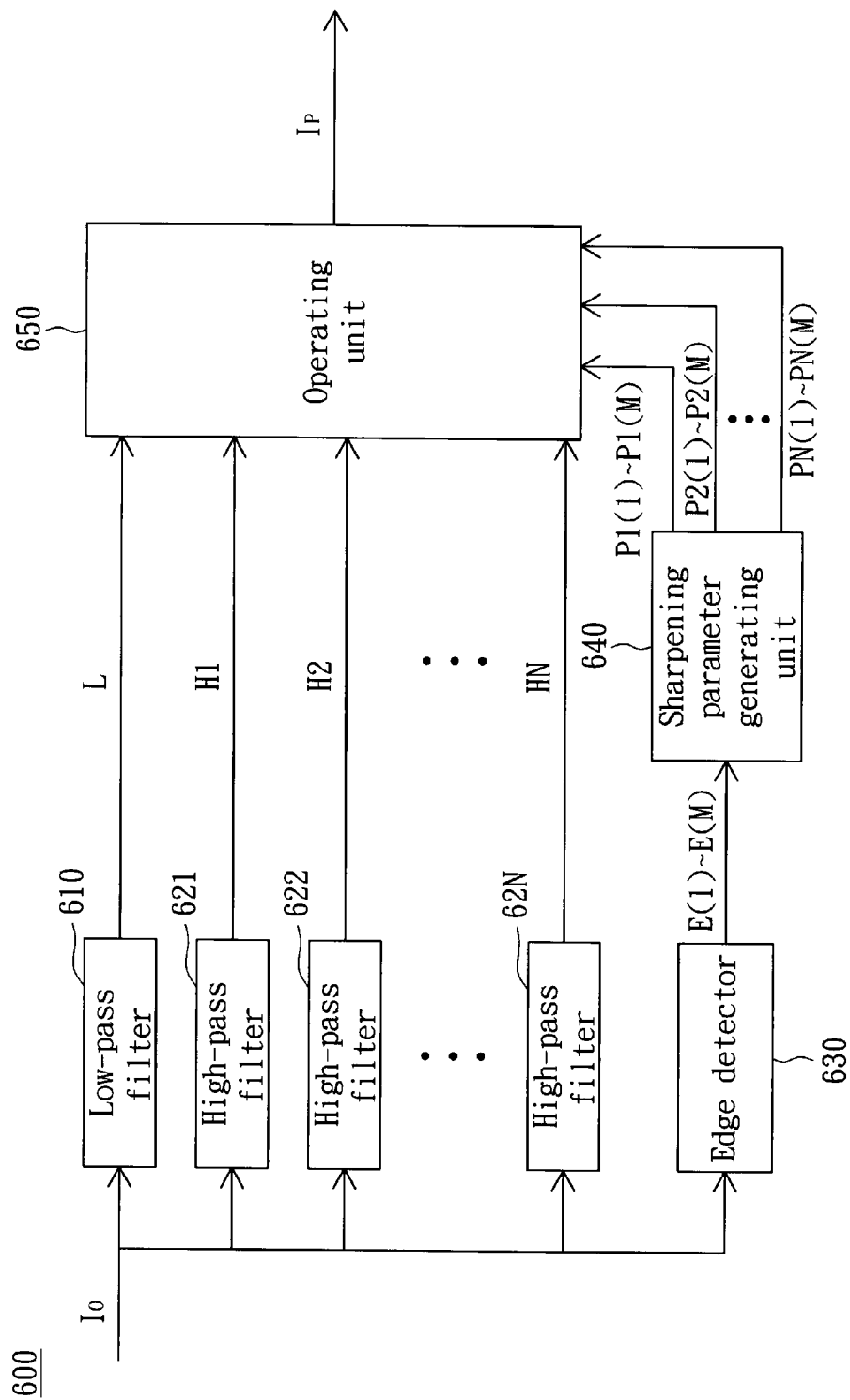
FIG. 6 is a block diagram showing an image sharpening apparatus according still another embodiment of the invention.

The image sharpening apparatus of this invention may also be implemented using a low-pass filter and a plurality of high-pass filters. FIG. 6 shows a block diagram showing an image sharpening apparatus 600 according to still another embodiment of the invention. As shown in FIG. 6, the image sharpening apparatus 600 uses one low-pass filter 610 and N high-pass filters 621 to 62N for decomposing the original image Io into a low frequency image L and N high frequency images H1 to HN, wherein N is a positive integer. A sharpening parameter generating unit 640 generates N sets of sharpening parameters P1(1)~P1(M), P2(1)~P2(M), . . . , PN(1)~PN(M) corresponding to the high frequency images H1 to HN, respectively, according to the edge detecting values E(1)~E(M), wherein M is a positive integer greater than or equal to 1. The relationship between each set of the sharpening parameters and the edge detecting values may be determined according to the requirement. Each high frequency image may be adjusted in the manner similar to that described hereinabove, and detailed description thereof will be omitted.

The operating unit 650 adjusts the edge region of all high frequency images according to the corresponding set of sharpening parameters, and totally outputs N adjusted high frequency images H1p~HNp. The operating unit 650 combines the low frequency image L with the N adjusted high frequency images H1p~HNp to obtain an output image Ip.

Figure 7:
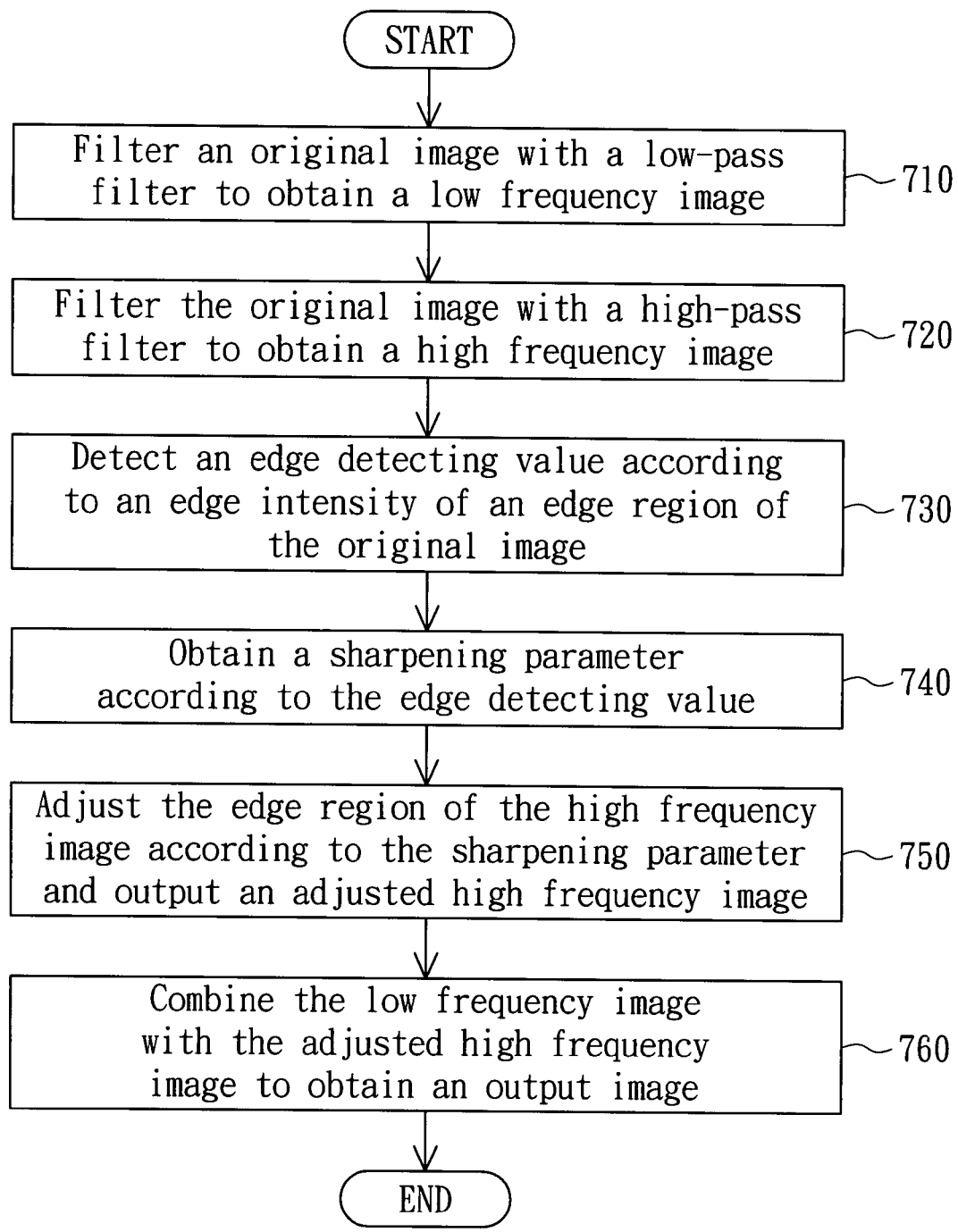
FIG. 7 shows an image sharpening method applied to the image sharpening apparatus of FIG. 1.

FIG. 7 shows an image sharpening method applied to the image sharpening apparatus 100 of FIG. 1. First, in step 710, filter the original image Io with a low-pass filter to obtain a low frequency image L. Next, in step 720, filter the original image Io with a high-pass filter to obtain a high frequency image H. It has to be noted that the order of steps 710 and 720 could be exchanged. Then, in step 730, detect edges of the original image Io to obtain the edge detecting values E(1)~E(M) according to the edge intensities, wherein M is a positive integer greater than or equal to 1. Thereafter, in step 740, obtain the corresponding sharpening parameters P(1)~P(M) according to the edge detecting values E(1)~E(M), respectively. Next, in step 750, adjust the edge region of the high frequency image H according to the sharpening parameters P(1)~P(M) and output the adjusted high frequency image Hp. Finally, in step 760, combine the low frequency image L with the adjusted high frequency image Hp to obtain the output image Ip.

The image sharpening apparatus according to the embodiment of the invention decomposes the original image into a low frequency image and the a frequency image, and enhance or lower the intensity of the high frequency image according to the edge intensity (taking noise standard deviation as unit) of the original image. Since most of noises are located in one noise standard deviation, the signals in the region are lowered or even eliminated. As for the signals between one noise standard deviation and two noise standard deviations, the intensities thereof are only lowered. Most of the signals in the region greater than two standard deviations are the real edge signals of the original image. So, the signals in this region are enhanced in order to sharpen the edge. Finally, as for the signals in the higher region (e.g., more than five noise standard deviations), the corresponding edge is very clear and needs not to be enhanced. Consequently, the image sharpening apparatus according to the embodiment of the invention can not only enhance the sharpness of the output image but also suppress the noises so that the quality of the output image is greatly enhanced.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image sharpening apparatus for enhancing a sharpness of an original image, the apparatus comprising:
   a low-pass filter for receiving the original image and outputting a low frequency image;
   a first high-pass filter for receiving the original image and outputting a high frequency image;
   an edge detector for receiving the original image and outputting an edge detecting value according to an edge intensity of an region of the original image;
   a sharpening parameter generating unit for receiving the edge detecting value and outputting a corresponding sharpening parameter; and
   an operating unit for adjusting the region of the first high frequency image according to the sharpening parameters to obtain an adjusted first high frequency image, and combining the low frequency image with the adjusted first high frequency image to obtain an output image.

2. The apparatus according to claim 1, wherein when the edge detecting value is smaller than a threshold value, the operating unit reduces the intensity of the region of the first high frequency image according to the sharpening parameter and thus outputs the adjusted first high frequency image.

3. The apparatus according to claim 2, wherein the threshold value is one noise standard deviation.

4. The apparatus according to claim 3, wherein the sharpening parameter corresponding to the edge detecting value is set as 0.

5. The apparatus according to claim 2, wherein the threshold value ranges between one noise standard deviation and two noise standard deviations.

6. The apparatus according to claim 5, wherein the sharpening parameter corresponding to the edge detecting value is set as greater than 0 but smaller than or equal to 1.

7. The apparatus according to claim 1, wherein the first high-pass filter comprises:
   a band-pass filter for receiving the original image and outputting a band frequency image; and
   a second high-pass filter for receiving the original image and outputting a second high frequency image;
   wherein the sharpening parameter comprises a first sharpening parameter and a second sharpening parameter;
   wherein the operating unit adjusts the region of the band frequency image according to the first sharpening parameter to output an adjusted band frequency image, and adjusts the region of the second high frequency image according to the second sharpening parameter to output an adjusted second high frequency image;
   wherein the adjusted first high frequency image includes the adjusted band frequency image and the adjusted second high frequency image; and
   wherein the operating unit combines the low frequency image, the adjusted band frequency image and the adjusted second high frequency image together to obtain the output image.

8. The apparatus according to claim 7, wherein when the edge detecting value is smaller than a threshold value, the operating unit reduces the intensity of the region of the band frequency image according to the first sharpening parameter, and outputs the adjusted band frequency image.

9. The apparatus according to claim 7, wherein when the edge detecting value is smaller than a threshold value, the operating unit reduces the intensity of the edge region of the second high frequency image according to the second sharpening parameter, and outputs the adjusted second high frequency image.

10. An image sharpening method for enhancing sharpness of an original image, the method comprising the steps of:
   filtering with an electronic apparatus the original image with a low-pass filter to obtain a low frequency image;
   filtering with the electronic apparatus the original image with a high-pass filter to obtain a high frequency image;
   detecting with the electronic apparatus an edge detecting value according to an edge intensity of an edge region of the original image;
   obtaining with the electronic apparatus a sharpening parameter according to the edge detecting value;
   adjusting with the electronic apparatus the edge region of the high frequency image according to the sharpening parameter and output an adjusted high frequency image;
   combining the low frequency image with the adjusted high frequency image to obtain an output image.

11. The method according to claim 10, wherein in the step of obtaining the adjusted high frequency image, when the edge detecting value is smaller than a threshold value, reduce the intensity of the region of the high frequency image according to the sharpening parameter to obtain the adjusted high frequency image.

12. The method according to claim 11, wherein the threshold value is one noise standard deviation.

13. An image sharpening apparatus for enhancing a sharpness of an original image, the image sharpening apparatus comprising:
   a low-pass filter for receiving the original image and outputting a low frequency image;
   N high-pass filters, each for receiving the original image and thus outputting a high frequency image;
   an edge detector for receiving the original image and thus outputting an edge detecting value according an edge intensity of an region of the original image;
   a sharpening parameter generating unit for receiving the edge detecting value and outputting N corresponding sharpening parameters, each of the N sharpening parameters corresponds to one of the N high frequency images; and
   an operating unit for respectively adjusting the region of the N high frequency images according to the N sharpening parameters, outputting N adjusted high frequency images, and combining the low frequency image with the N adjusted high frequency images to obtain an output image,
   wherein N is a positive integer, and the low frequency image and the N high frequency images are combined together to form the original image.

14. The apparatus according to claim 13, wherein the operating unit adjusts the $i^{th}$ high frequency image according to the $i^{th}$ of the N sharpening parameters, and outputs the $i^{th}$ adjusted high frequency image, wherein i is a positive integer smaller than or equal to N.

15. The apparatus according to claim 14, wherein when the edge detecting value is small than a threshold value, the operating unit reduces the intensity of the region of the $i^{th}$ high frequency image according to the $i^{th}$ sharpening parameter corresponding to the edge detecting values, and thus outputs the $i^{th}$ adjusted high frequency image.

16. The apparatus according to claim 15, wherein the threshold value is one noise standard deviation.

17. The apparatus according to claim 16, wherein the sharpening parameter corresponding to the edge detecting value is set as 0.

18. The apparatus according to claim 15, wherein the threshold value ranges between one noise standard deviation and two noise standard deviations.

19. The apparatus according to claim 18, wherein the sharpening parameters corresponding to the edge detecting values are greater than 0 but smaller than or equal to 1.

* * * * *